(12) United States Patent
Golding

(10) Patent No.: US 11,461,678 B2
(45) Date of Patent: Oct. 4, 2022

(54) DIGITAL BLOCKCHAIN FOR LENDING

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

( * ) Notice: Subject to any disclaimer, the term of this patent is extended or adjusted under 35 U.S.C. 154(b) by 334 days.

(21) Appl. No.: 16/826,072

(22) Filed: Mar. 20, 2020

(65) Prior Publication Data

US 2020/0302315 A1    Sep. 24, 2020

Related U.S. Application Data

(63) Continuation-in-part of application No. 16/360,550, filed on Mar. 21, 2019.

(51) Int. Cl.
| | | |
|---|---|---|
| *G06Q 30/00* | (2012.01) | |
| *G06N 5/04* | (2006.01) | |
| *G06Q 40/02* | (2012.01) | |
| *G06N 20/00* | (2019.01) | |

(52) U.S. Cl.
CPC .............. *G06N 5/04* (2013.01); *G06N 20/00* (2019.01); *G06Q 40/025* (2013.01)

(58) Field of Classification Search
None
See application file for complete search history.

(56) References Cited

U.S. PATENT DOCUMENTS

| | | | | |
|---|---|---|---|---|
| 10,841,372 | B1* | 11/2020 | Ram | H04L 65/80 |
| 2016/0012465 | A1* | 1/2016 | Sharp | G06Q 20/321 |
| | | | | 705/14.17 |
| 2019/0114706 | A1* | 4/2019 | Bell | H04L 9/3239 |
| 2019/0164221 | A1* | 5/2019 | Hill | G06Q 20/3825 |
| 2019/0354611 | A1* | 11/2019 | Snow | H04L 9/3239 |
| 2020/0302315 | A1* | 9/2020 | Golding | G06N 5/04 |

* cited by examiner

*Primary Examiner* — Matthew T Sittner
(74) *Attorney, Agent, or Firm* — Ferguson Braswell Fraser Kubasta PC

(57) ABSTRACT

A method includes receiving, by a loan program executing on a loan computing system, conditions from an originator program executing on an originator computing system. The conditions are sent, by the loan program, to a wallet program executing on a wallet computing system. Cryptographic proof that the conditions are met is received by the loan program from the wallet program. Ownership data of the loan program is updated by the loan program to identify a buyer program executing on a buyer computing system in response to invocation of a purchase function of the loan program. Payment receipt data is appended, by the loan program, to the loan program in response to invocation of a payment append function of the loan program by a loan service program executing on a loan service computing system.

20 Claims, 6 Drawing Sheets

DIGITAL BLOCKCHAIN FOR LENDING

CROSS-REFERENCE TO RELATED APPLICATIONS

This application is a continuation-in-part of co-pending application Ser. No. 16/360,550, filed Mar. 21, 2019, and this application claims the benefit of U.S. Provisional Application No. 62/835,872, filed Apr. 18, 2019. Each of the applications identified above are incorporated herein by reference in their entirety.

BACKGROUND

Protocols for computing systems provide a mechanism for the organized transfer of data between computing systems. With computing systems that store and record data for electronic lending, a challenge is to provide a protocol that allows access by different systems and programs in a secure manner.

SUMMARY

In general, in one or more aspects, the disclosure relates to a method that includes receiving, by a loan program executing on a loan computing system, conditions from an originator program executing on an originator computing system. The conditions are sent, by the loan program, to a wallet program executing on a wallet computing system. Cryptographic proof that the conditions are met is received by the loan program from the wallet program. The wallet program retrieved a first proof from the wallet program, received a second proof from a credit reporting service program executing on a credit reporting service computing system, received a third proof from the originator program, and generated the cryptographic proof from the first proof, the second proof, and the third proof. Ownership data of the loan program is updated by the loan program to identify a buyer program executing on a buyer computing system in response to invocation of a purchase function of the loan program. Payment receipt data is appended, by the loan program, to the loan program in response to invocation of a payment append function of the loan program by a loan service program executing on a loan service computing system.

In general, in one or more aspects, the disclosure relates to a system that includes a loan computing system with a processor and a memory coupled to the processor. The loan computing system includes a loan program that executes on the loan computing system and receives conditions from an originator program executing on an originator computing system. The conditions are sent, by the loan program, to a wallet program executing on a wallet computing system. Cryptographic proof that the conditions are met is received by the loan program from the wallet program. The wallet program retrieved a first proof from the wallet program, received a second proof from a credit reporting service program executing on a credit reporting service computing system, received a third proof from the originator program, and generated the cryptographic proof from the first proof, the second proof, and the third proof. Ownership data of the loan program is updated by the loan program to identify a buyer program executing on a buyer computing system in response to invocation of a purchase function of the loan program. Payment receipt data is appended, by the loan program, to the loan program in response to invocation of a payment append function of the loan program by a loan service program executing on a loan service computing system.

In general, in one or more aspects, the disclosure relates to a set of one or more non-transitory computer readable mediums with computer readable program code for receiving, by a loan program executing on a loan computing system, conditions from an originator program executing on an originator computing system. The conditions are sent, by the loan program, to a wallet program executing on a wallet computing system. Cryptographic proof that the conditions are met is received by the loan program from the wallet program. The wallet program retrieved a first proof from the wallet program, received a second proof from a credit reporting service program executing on a credit reporting service computing system, received a third proof from the originator program, and generated the cryptographic proof from the first proof, the second proof, and the third proof. Ownership data of the loan program is updated by the loan program to identify a buyer program executing on a buyer computing system in response to invocation of a purchase function of the loan program. Payment receipt data is appended, by the loan program, to the loan program in response to invocation of a payment append function of the loan program by a loan service program executing on a loan service computing system.

Other aspects of the invention will be apparent from the following description and the appended claims.

DETAILED DESCRIPTION

Figure 1:
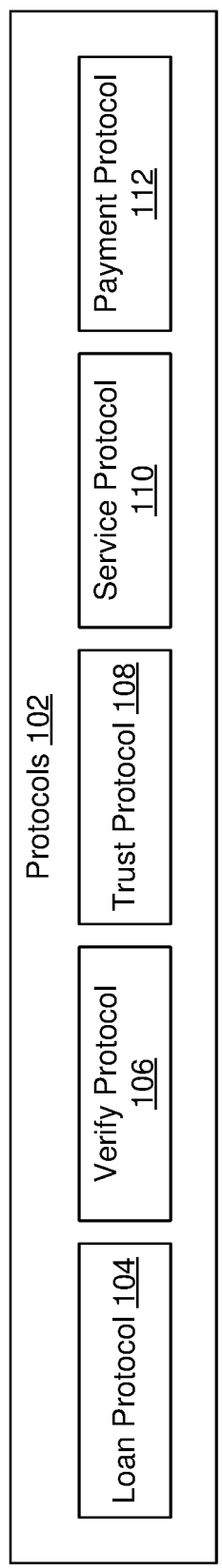
FIG. 1 shows a diagram of protocols in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.)

may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to decentralized lending using a set of protocols. With decentralized lending, a loan is a set of digital records/processes used with the protocols on a blockchain that is open, permissionless, and loosely coupled. Any user from individuals to large institutions may participate using the protocols for decentralized lending. Loans (or fractional notes, i.e., payment obligations that are dependent on payments received on a consumer loan) are fully tradeable programmatically via an immutable cryptographic chain of custody. Payments follow the loans, i.e., there is an automatic flow of payments to current owners of the loans. Additionally, a private trust network by third parties (e.g., institutional investors or securitization partners) may still be overlaid.

FIG. 1 shows a set of protocols (102) for decentralized lending with a blockchain. The protocols (102) include the loan protocol (104), the verify protocol (106), the trust protocol (108), the service protocol (110), and the payment protocol (112).

The loan protocol (104) provides for a loan registry, loan trading, loan payment forking (which may be part of a fractional note program in which a retail investor has rights to payments or portions of payments of an underlying loan), loan pooling, loan storage, a securitization oracle, etc. In one or more embodiments, the loan protocol (104) requires a number of interacting smart contracts, including smart contracts for payment contracts, service contracts, and proxy contracts.

The verify protocol (106) provides for identification, know your customer (KYC) compliance, credit checks, credit criteria, distributed credit score, payroll history, tax filings, etc.

The trust protocol (108) provides for private exchanges, oracle selection, state channel selection, proxy contracts, acceptance contracts, proof negotiations, etc. With the trust protocol (108), participants select and cryptographically prove the desired level of trust between parties for the operation of the other protocols.

The service protocol (110) provides for payment history, payment channels, reputation, proof of stake, etc. The service protocol (110) is a mechanism for servicing loans, including the collection of payments and handling of defaults.

The payment protocol (112) provides for payments, remittances, investments, transfer of loans, etc. The payment protocol (112) may set up the means of payment for the service protocol.

Figure 2:
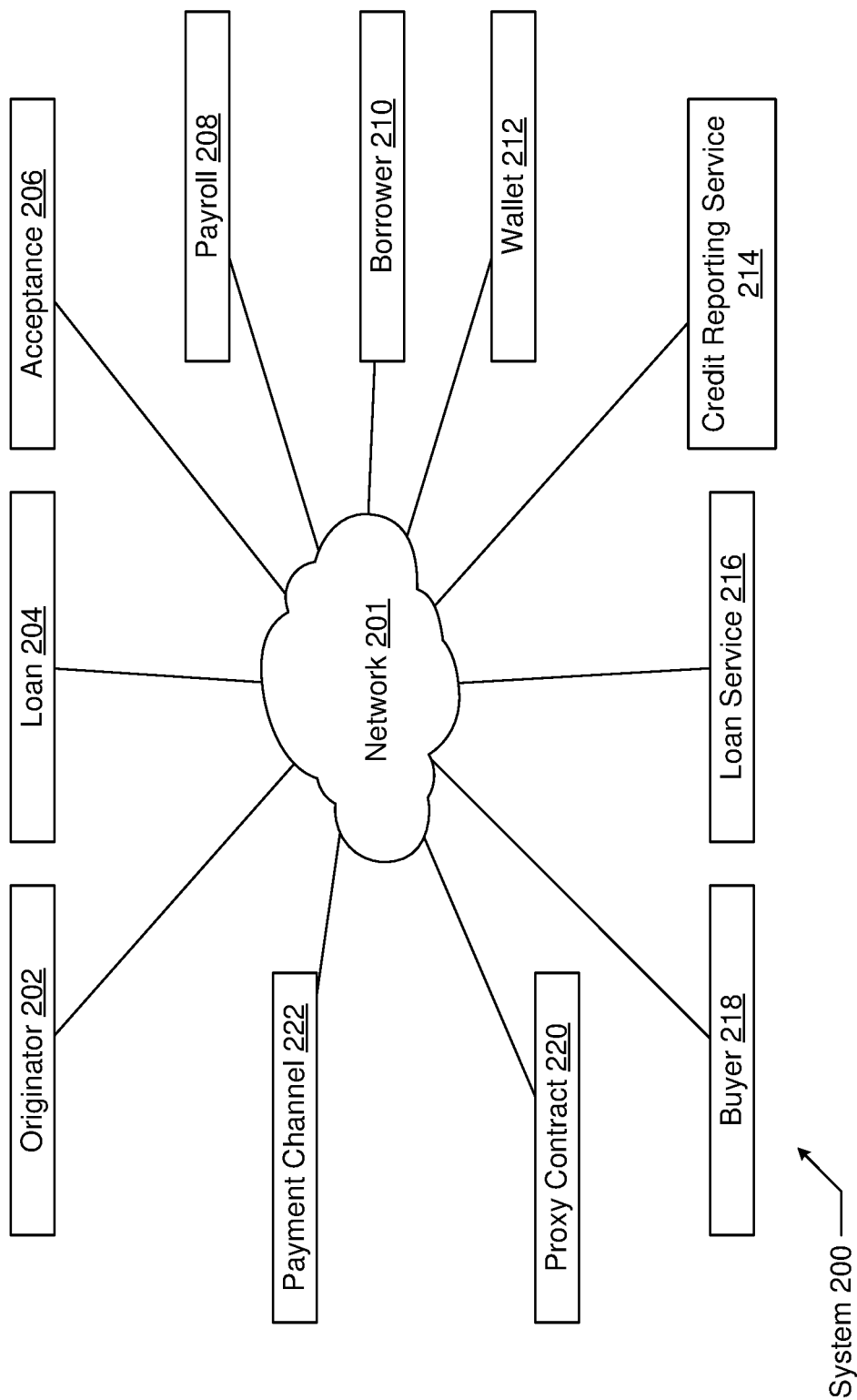
FIG. 2 shows a diagram of a system in accordance with disclosed embodiments.

FIG. 2 shows a diagram of the system (200) for decentralized lending in accordance with one or more disclosed embodiments. The various elements of the system (200) may correspond to the computing system shown in FIG. 4A and FIG. 4B. In particular, the type, hardware, and computer readable medium for the various components of the system (200) is presented in reference to FIG. 4A and FIG. 4B. In one or more embodiments, one or more of the elements shown in FIG. 2 may be omitted, repeated, combined, and/or altered as shown from FIG. 2. Accordingly, the scope of the present disclosure should not be considered limited to the specific arrangements shown in FIG. 2.

The system (200) includes data, programs, computer systems, networks, etc. for decentralized lending. In one or more embodiments, the system (200) includes the network (201), the originator (202), the loan (204), the acceptance (206), the payroll (208), the borrower (210), the wallet (212), the credit reporting service (214), the loan service (216), the buyer (218), the proxy contract (220), and the payment channel (222).

The network (201) is a data communications network that interconnects the components of the system (200). In one or more embodiments, the network (201) includes the internet.

The originator (202) includes data and programs running on computer systems that represent a loan originator. In one or more embodiments, the originator (202) originates the loan (204) using the protocols (102) of FIG. 1.

The loan (204) includes data and programs running on computer systems that represent a loan. In one or more embodiments, the loan (204) includes the data listed below. The first nine fields ("LoanId" through "APR") represent standard loan data. The last three fields ("Owner", "Originator", and "Promissory") represent blockchain data or cryptographically secured data. Other fields may be present in the digital loan record.

```
"NewLoan": {
"LoanId": 313333,
"LoanTerm": 36,
"LoanCreatedDate": "2018-01-09T08:04:44.230",
"LoanOriginationDate": "2018-01-10T00:00",
"LoanMaturityDate": "2021-01-10T00:00",
"MonthlyPaymentAmount": 180.66,
"MonthlyPaymentAmountLast": 180.20,
"LoanAmount": 6000.0,
"APR": 0.059,
"Owner": <some_blockchain_address>,
"Originator": <some_blockchain_address>,
"Promissory": <some_ipfs_address> }
```

In one or more embodiments, the loan (204) includes functions that can be performed on the data in the loan, e.g.:

```
transfer (from, to)
burn ( )
updatePayments (amount)
```

In one or more embodiments, the loan (204) is a smart contract with data and bindings to a publicly accessible or private blockchain. In one or more embodiments, the application programming interface (API) to the functions of the loan (204) is the loan protocol (104) of FIG. 1. The loan (204) and its activities cannot be independently altered or faked due to the cryptographic consensus required by the blockchain used to store and verify the loan. In one or more embodiments, the blockchain is implemented using Merkle directed acyclic graphs (DAGs), the interplanetary file system (IPFS) protocol, peer to peer (P2P) protocols, blockchain protocols (including Ethereum), etc. The blocks of a blockchain are immutable with a hash value generated from data in the block and from a hash value of a prior block.

The acceptance (206) includes data and programs running on computer systems that represent an acceptance service. In one or more embodiments, the acceptance service determines whether an application for the loan (204) will be accepted based on a condition of the loan (204). The acceptance (206), also referred to as an acceptance service, cryptographically determines the acceptance criteria for any aspect of the lending process (across all protocols), e.g., when and how to accept a loan application, a loan purchase, a loan sale, a payment method, etc.

The payroll (208) includes data and programs running on computer systems that represent a payroll service. In one or more embodiments, the payroll service interacts with the acceptance service for determining the acceptance of the loan (204) for an individual borrower.

The borrower (210) includes data and programs running on computer systems that represent an individual borrower of the loan (204). In one or more embodiments, the borrower (210) includes one or more computers and programs of a user of the system (200), including smartphones, desktop computers, web browsers, etc. that access the loan (204) and the wallet (212) through the network (201).

The wallet (212) includes data and programs running on computer systems that represent the financial accounts and forms of payment of the borrower (210).

In one or more embodiments, the wallet (212) is a digital wallet that may be used to make payments on the loan (204). The wallet (212) may also store a borrower's cryptographically secured data, include the payroll history, the credit history, the verified identity, etc., of the borrower.

The credit reporting service (214) includes data and programs running on computer systems that represent a credit reporting service, such as Experian, Equifax, or TransUnion. In one or more embodiments, the credit reporting service (214) provides information used to determine whether to accept an application for the loan (204) for the borrower (210). The credit reporting service (214) aggregates functions for credit reporting that are selected by the operator and maintainer of the credit reporting service (214). As an example, the credit reporting service (214) may provide a credit score with a cryptographic proof as part of a block in a blockchain that is used by other parts of the system to determine approval for a loan, loan amount, line of credit, etc.

The loan service (216) includes data and programs running on computer systems that represent a loan servicer. In one or more embodiments, the loan service (216) collects payments from the borrower (210) for the loan (204) via the wallet (212).

The buyer (218) includes data and programs running on computer systems that represent a buyer of the loan (204). In one or more embodiments, the buyer (218) buys the loan (204) from the originator (202) and may pool the loan (204) with other loans.

The proxy contract (220) includes data and programs running on computer systems. In one or more embodiments, the proxy contract (220) is a smart contract used by the buyer (218) to pool one or more loans with the loan (204). The proxy contract (220) is a cryptographically secured set of operations that act on behalf of a network participant (e.g., a borrower, a lender, etc.). It represents an aggregate of all the functions selected by that participant that will be performed by the available protocols. For example, the proxy contract (220) may represent the functions a borrower performs in order to apply for and pay for a loan.

The payment channel (222) includes data and programs running on computer systems. In one or more embodiments, the payment channel (222) is a channel through which the loan (204) is serviced by the loan servicer to collect payments from the borrower (210) through the wallet (212).

Figure 3A:
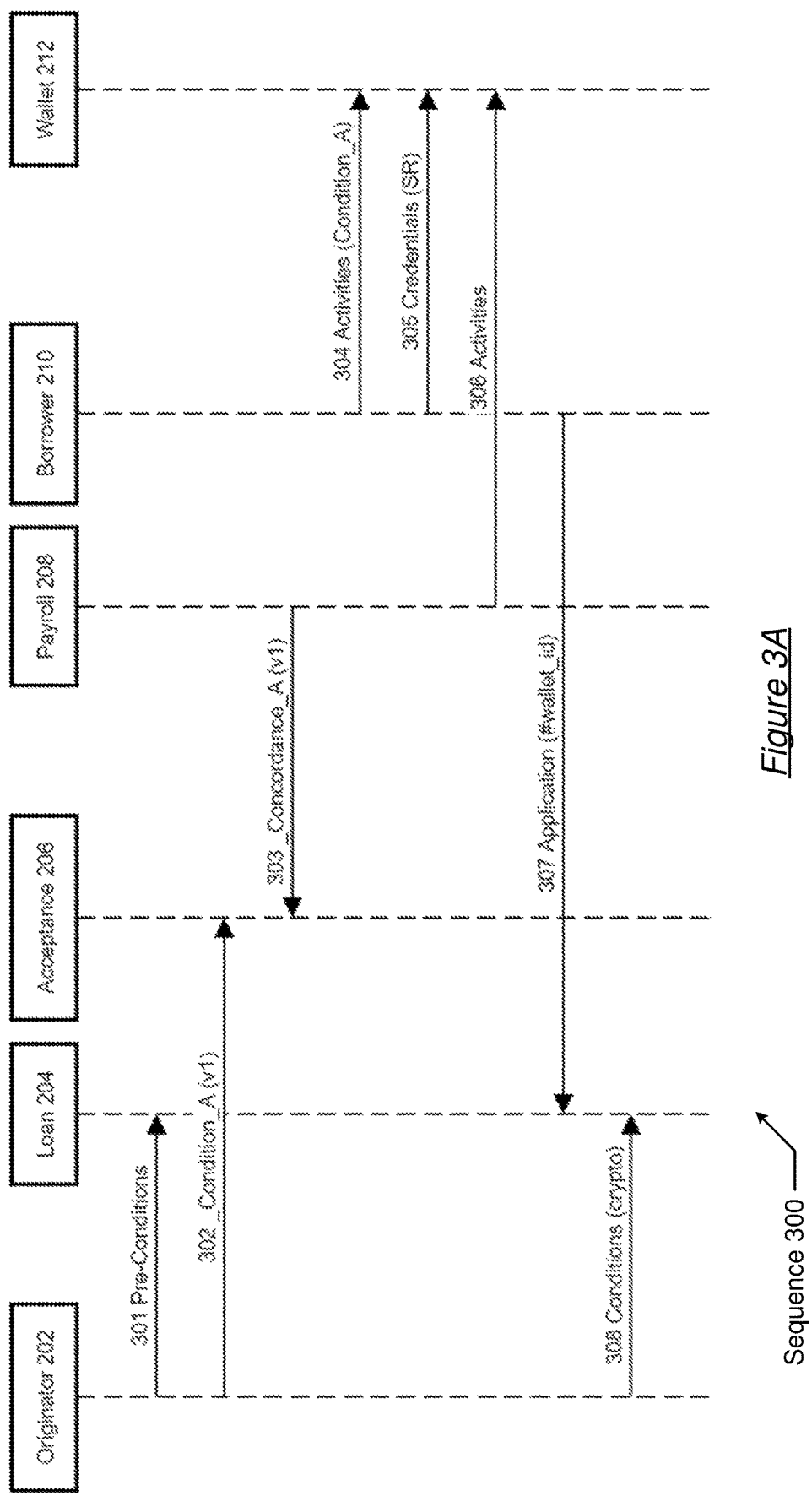
FIG. 3A, FIG. 3B, and FIG. 3C show a sequence in accordance with one or more embodiments of the invention.
Figure 3B:
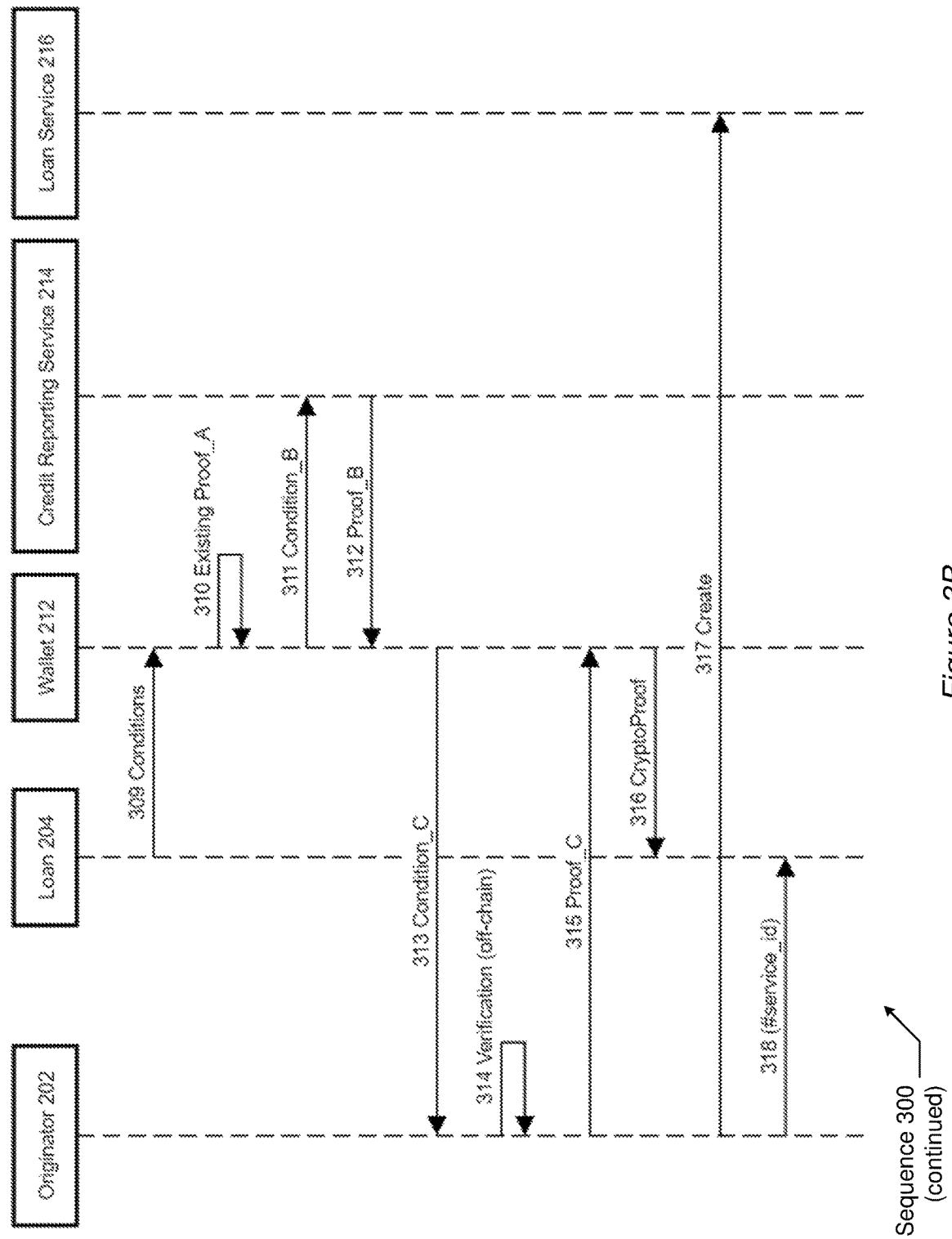
Figure 3C:
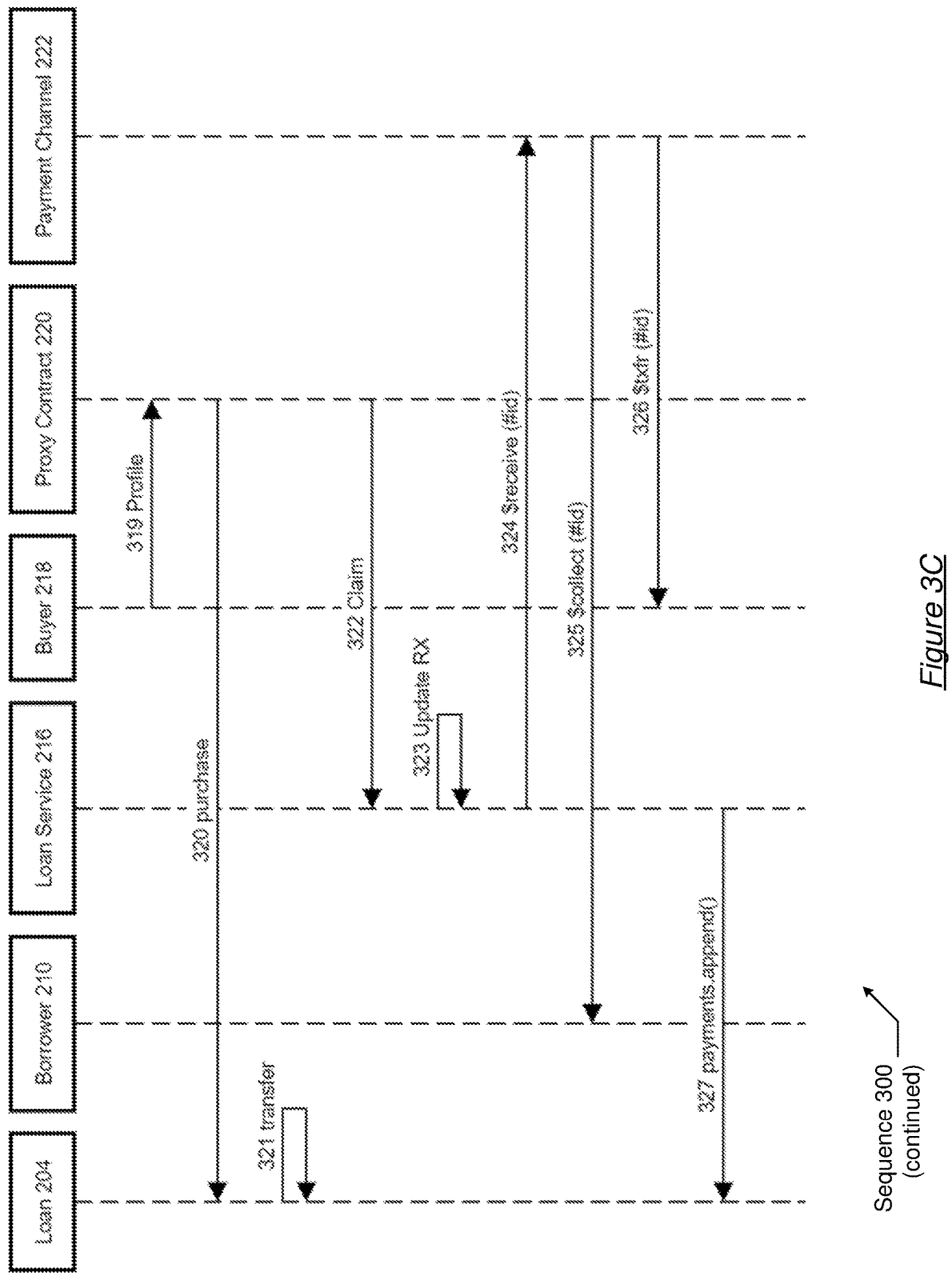

FIGS. 3A, 3B, and 3C show a sequence diagram in accordance with one or more embodiments of the disclosure. The diagrams of FIGS. 3A, 3B, and 3C depict a sequence (300) of processes for digital decentralized lending using blockchains. The processes of the sequence (300) may be implemented on one or more components of the system (200) of FIG. 2. In one or more embodiments, one or more of the steps shown in FIGS. 3A, 3B, and 3C may be omitted, repeated, combined, and/or performed in a different order than the order shown in FIGS. 3A, 3B, and 3C. Accordingly, the scope of the present disclosure should not be considered limited to the specific arrangement of steps shown in FIGS. 3A, 3B, and 3C.

Referring to FIG. 3A, Steps 301 through 318 illustrate a part of the sequence (300) for creation of a loan.

In Step 301, preconditions are sent from the originator (202) to the loan (204). In one or more embodiments, the originator identifies a set of preconditions that are to be met by a borrower for an application to be accepted. The preconditions are received by the loan (204), which is a smart contract, and stored in the blockchain as part of the loan (204).

In Step 302, a condition is sent from the originator (202) to the acceptance (206). In one or more embodiments, the condition is one of the preconditions that are required by a loan (204). In one or more embodiments, the condition is a minimum amount of periodic income (e.g., monthly income greater than a predetermined amount or greater than a percentage of the loan amount), a minimum credit score, a debt-to-income ratio, etc. The conditions are described in a way that can be cryptographically proven using the network protocols.

In Step 303, a concordance is sent from the payroll (208) to the acceptance (206). In one or more embodiments, the concordance is an electronic file (which may be a smart contract or other cryptographically verifiable document) that includes information related to the condition. For example, the concordance may include proof of the periodic income of the borrower. Multiple concordances may be provided to fulfill the preconditions on a loan.

In Step 304, activities are sent from the borrower (210) to the wallet (212).

In one or more embodiments, the activities include information related to the condition from the preconditions. For example, an activity may include the transfer of monetary value, or proof thereof, from the payroll (208) to the wallet (212) that is the periodic income of the borrower. The activities are cryptographically verifiable to the satisfaction of the pre-conditions as determined by the acceptance service.

In Step 305, credentials are sent from the borrower (210) to the wallet (212). In one or more embodiments, the credentials allow for the payment activity (e.g., the transfer of monetary value from the payroll (208) to the wallet (212)) to be completed by the wallet (212). Credentials include cryptographically verifiable data that attests to a credential of the user, such as the verified identity of the user.

In Step 306, activities take place between the payroll (208) and the wallet (212). For example, an activity may include the transfer of monetary value, or a receipt thereof, from the payroll (208) to the wallet (212). As another example, an activity may include the issuance of a tax form, such as a 1099.

In Step 307, an application is sent from the borrower (210) to the loan (204). In one or more embodiments, the application includes a wallet identifier that identifies the wallet (212) and does not include personally identifying information, such as age, gender, race, etc. The application includes as much information as the loan service requires according to the pre-conditions set by the originator.

In Step 308, after receiving the application from the borrower (210), the loan (204) receives conditions from the originator (202). In one or more embodiments, the conditions specify additional criteria to be met by the borrower (210) for which a cryptographic proof is required for the loan (204) to be granted to the borrower (210). The preconditions may be used to establish the minimum criteria for initiating a loan application. The full conditions received in Step 308 are used to specify the entirety of conditions needed to originate the loan.

Referring to FIG. 3B, in Step 309, the conditions are sent from the loan (204) to the wallet (212). In one or more embodiments, the wallet (212) collects the proof necessary to meet the conditions and generates a cryptographic proof that identifies that the conditions are met, as described below. As an example, the conditions may include three conditions ("Condition_A", "Condition_B", and "Condition_C") for which three proofs ("Proof_A", "Proof_B", and "Proof_C") are required. In one or more embodiments, the first condition is a minimum amount of periodic income, the second condition is a minimum credit score reported by a credit reporting service, and the third condition is a verification performed by the originator (202) that the first two conditions have been met.

In Step 310, the wallet (212) retrieves a proof ("Proof_A") that already exists on the wallet (212). For example, proof may include information of periodic monetary transactions stored on the wallet (212) that satisfy a condition that requires a minimum periodic income for a predefined length of time.

In Step 311, a condition is sent from the wallet (212) to the credit reporting service (214). In one or more embodiments, the condition is sent in the form of a request to the credit reporting service (214) for a credit score of the borrower (210).

In Step 312, a proof related to the condition is sent from the credit reporting service (214) to the wallet (212). In one or more embodiments, proof is sent in the form of a credit report in response to the request from the wallet (212). Step 312 is an example of a permissioned request for data whereby, in order to meet the conditions, the user (via the wallet (212)) has requested data from a third party (the credit reporting service). The data retrieved from the third party includes cryptographically verifiable data that can be shown, cryptographically, to constitute a proof that satisfies the condition.

In Step 313, a condition is sent from the wallet (212) to the originator (202). In one or more embodiments, the condition is sent in the form of a request to the originator (202) for an additional proof. For example, the request may include the first two proofs for the two conditions that can be satisfied by the wallet (212) and include a request to verify the first two proofs and to send a third proof based on the verification of the first two proofs.

In Step 314, verification is performed by the originator (202). In one or more embodiments, the verification is performed "off-chain" by the originator (202) contacting the acceptance (206) (or the payroll (208)) and the credit reporting service (214) to verify the information in the proofs received from the wallet (212) without recording these steps in the blockchain of the loan (204). Performance of the verification "off-chain" does not involve appending additional blocks to the blockchain. However, the subsequently verified data may be committed to the blockchain as a cryptographic proof. In some embodiments, committing the verified data may involve an extra step to send the verified data back to the wallet of the user for future use as a proof, such as in Step 315.

In Step 315, a proof is sent from the originator (202) to the wallet (212). In one or more embodiments, the proof is the third proof that shows verification of the first two proofs by the originator (202).

In Step 316, a proof is sent from the wallet (212) to the loan (204). In one or more embodiments, the proof is fourth proof that is a cryptographic proof generated from the other proofs received by the wallet (212). In one or more embodiments, each of the proofs may include a hash value generated from the information in the proof and from a hash value of a prior proof to create an immutable chain of proof. In one or more embodiments, the fourth cryptographic proof does not include personally identifying information of the borrower (210) and still satisfies the evidentiary requirements for the loan (204).

In Step 317, loan service (216) is connected to the loan (204) by the originator (202). In one or more embodiments, the originator (202) executes a remote procedure call of the loan service (216) for creation of the loan (204) so that the loan service (216) will begin to service the loan (204).

In Step 318, a service identifier is sent from the originator (202) to the loan (204). In one or more embodiments, the loan (204) records the service identifier in the blockchain.

Referring to FIG. 3C, Steps 319 through 323 illustrate a part of the sequence (300) for buying a loan (e.g., an entity or person purchasing the loan from the originator or a previous owner of the loan).

In Step 319, a profile is sent from the buyer (218) to the proxy contract (220). In one or more embodiments, the proxy contract (220) pools the loan (204) with other loans into a larger financial instrument.

In Step 320, a purchase is made between the proxy contract (220) and the loan (204). In one or more embodiments, the proxy contract (220) is a smart contract that invokes the purchase function of the smart contract of the loan (204).

In Step 321, the loan (204) is transferred. In one or more embodiments, the loan is transferred in response to invocation of the purchase function and is performed by recording information from the profile of the buyer (218) that is received from the proxy contract (220) and that indicates that the buyer (218) is the owner of the loan (204).

In Step 322, a claim is sent from the proxy contract (220) to the loan service (216). In one or more embodiments, the claim identifies the buyer (218) as the receiver of future payments on the loan (204). The claim is cryptographically verifiable by the loan service such that the new owner of the loan is legally entitled to receive payments against the loan, in whole or in part (for fractional notes). The claim may include payment channel information that the loan service can use to send payments made by the borrower against the loan.

In Step 323, the loan service (216) updates the receiver. In one or more embodiments, the receiver of future payments on the loan (204) is updated to the buyer (218) in response to the claim sent by the proxy contract (220).

Steps 324 through 327 illustrate a part of the sequence (300) for servicing the loan (204).

In Step 324, the loan service (216) initiates receiving payment using the payment channel (222). In one or more embodiments, the loan service (216) invokes a receive function of the payment channel (222).

In Step 325, the payment channel (222) initiates collecting payment from the borrower (210). In one or more embodiments, the payment channel (222) invokes a collect function of the borrower (210) to collect a payment for the loan (204).

In Step 326, the payment channel (222) initiates a transfer to the buyer (218). In one or more embodiments, the payment channel (222) invokes a transfer function of the buyer (218) to transfer the payment collected from the borrower (210) to the buyer (218).

In Step 327, the loan service (216) appends the payment to the loan (204).

In one or more embodiments, the loan service (216) invokes the "payments.append( )" function of the smart contract of the loan (204) to update the loan (204) by appending evidence of the collection of the payment.

Figure 4A:
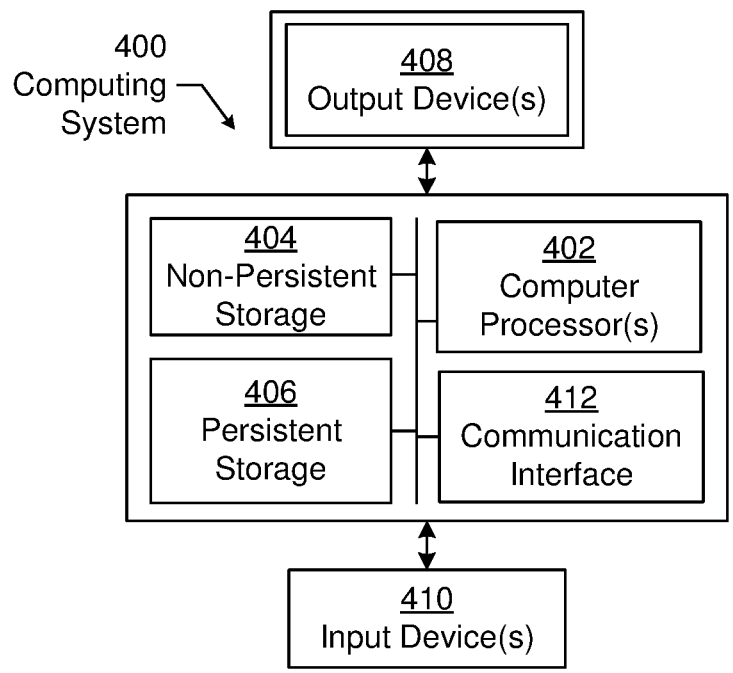
FIG. 4A and FIG. 4B show computing systems in accordance with disclosed embodiments.

Embodiments may be implemented on the computing system (400). Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 4B:
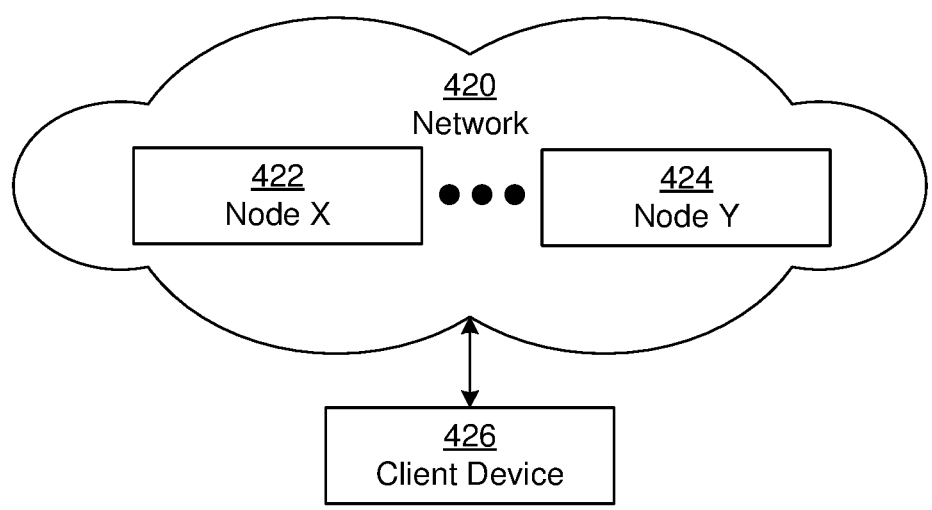

The computing system (400) in FIG. 4A may be connected to or be a part of a network. For example, as shown in FIG. 4B, the network (420) may include multiple nodes (e.g., node X (422), node Y (424)). Nodes may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform at least a portion of one or more embodiments of the disclosure.

The computing system or group of computing systems described in FIG. 4A and 4B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different applications and may execute on the same or different computing systems.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed, according to the organizing pattern, to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the disclosure, may perform data comparison. Data comparison may be used to compare two or more data values (e.g., A, B). For example, one or more embodiments may determine whether $A>B$, $A=B$, $A !=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
receiving, by a loan program executing on a loan computing system, conditions from an originator program executing on an originator computing system, wherein the conditions are displayed by the loan program on a user interface of the loan computing system;
sending, by the loan program, the conditions to a wallet program executing on a wallet computing system;
receiving, by the loan program, cryptographic proof that the conditions are met from the wallet program, wherein the cryptographic proof is displayed by the loan program on the user interface of the loan computing system, and wherein the wallet program retrieved a first proof from the wallet program, received a second proof from a credit reporting service program executing on a credit reporting service computing system, received a third proof from the originator program, and generated the cryptographic proof from the first proof, the second proof, and the third proof;
updating, by the loan program, ownership data of the loan program to identify a buyer program executing on a buyer computing system in response to invocation of a purchase function of the loan program, wherein the ownership data is displayed by the loan program on the user interface of the loan computing system; and
appending, by the loan program, payment receipt data to the loan program in response to invocation of a payment append function of the loan program by a loan service program executing on a loan service computing system, wherein the payment receipt data is displayed by the loan program on the user interface of the loan computing system.

2. The method of claim 1, wherein the loan computing system, the wallet computing system, the credit reporting service computing system, the buyer computing system, and the loan service computing system are each different computing systems.

3. The method of claim 1, further comprising:
receiving preconditions, by the loan program from the originator program, wherein the loan program stores the preconditions within the loan program;
sending a condition, by the originator program to an acceptance program executing on an acceptance computing system, wherein the condition matches one of the preconditions and identifies a threshold value of income data; and
receiving, by the acceptance program, a concordance from a payroll program executing on a payroll computing system, wherein the concordance includes a proof of periodic income for comparison to the threshold value.

4. The method of claim 1, further comprising:
receiving, by the wallet program from a borrower program executing on a borrower computing system, activity data related to a condition of the conditions;
receiving, by the wallet program from the borrower program, credential data for payroll activity data; and
receiving, by the wallet program from a payroll program executing on a payroll computing system, the payroll activity data.

5. The method of claim 1, further comprising:
receiving, by the loan program from a borrower program executing on a borrower computing system, application data for the loan program that is compared against the conditions.

6. The method of claim 1, further comprising:
sending, by the originator program to the loan service program, a remote procedure call to initiate the loan service program; and
sending, by the originator program to the loan program, a service identifier identifying the loan service program.

7. The method of claim 1, further comprising:
sending, from the buyer program to a proxy contract program executing on a proxy contract computing system, a profile identifying the loan program from within a pool of loan programs;
invoking, by the proxy contract program, a purchase function of the loan program to update the loan program based on the buyer program;
sending, from the proxy contract program, a claim to the loan service program; and
updating, by the loan service program, receiver data to the buyer program in response to the claim.

8. The method of claim 1, further comprising:
invoking, by the loan service program, a receive function of a payment channel program executing on a payment channel computing system;
invoking, by the payment channel program, a collect function of a borrower program executing on a borrower computing system to transfer payment data; and
invoking, by the payment channel program, a transfer function of the buyer program to transfer payment data.

9. A system comprising:
a loan computing system comprising a processor and a memory coupled to the processor;
the loan computing system comprising a loan program, wherein the loan program executes on the loan computing system and performs the operations of:
receiving, by the loan program, conditions from an originator program executing on an originator computing system, wherein the conditions are displayed by the loan program on a user interface of the loan computing system;
sending, by the loan program, the conditions to a wallet program executing on a wallet computing system;
receiving, by the loan program, cryptographic proof that the conditions are met from the wallet program, wherein the cryptographic proof is displayed by the loan program on the user interface of the loan computing system, and wherein the wallet program retrieved a first proof from the wallet program, received a second proof from a credit reporting service program executing on a credit reporting service computing system, received a third proof from the originator program, and generated the cryptographic proof from the first proof, the second proof, and the third proof;
updating, by the loan program, ownership data of the loan program to identify a buyer program executing on a buyer computing system in response to invocation of a purchase function of the loan program, wherein the ownership data is displayed by the loan program on the user interface of the loan computing system; and
appending, by the loan program, payment receipt data to the loan program in response to invocation of a payment append function of the loan program by a loan service program executing on a loan service computing system, wherein the payment receipt data is displayed by the loan program on the user interface of the loan computing system.

10. The system of claim 9, further comprising:
the loan program further performing the operation of:
receiving preconditions, by the loan program from the originator program, wherein the loan program stores the preconditions within the loan program;
the originator computing system comprising the originator program, wherein the originator program executes on the originator computing system and performs the operation of: sending a condition, by the originator program to an acceptance program executing on an acceptance computing system, wherein the condition matches one of the preconditions and identifies a threshold value of income data; and
the acceptance computing system comprising the acceptance program, wherein the acceptance program executes on the acceptance computing system and performs the operation of: receiving, by the acceptance program, a concordance from a payroll program executing on a payroll computing system, wherein the concordance includes a proof of periodic income for comparison to the threshold value.

11. The system of claim 9, further comprising:
the wallet computing system comprising the wallet program, wherein the wallet program executes on the wallet computing system and performs the operations of: receiving, by the wallet program from a borrower program executing on a borrower computing system, activity data related to a condition of the conditions; receiving, by the wallet program from the borrower program, credential data for payroll activity data; and
receiving, by the wallet program from a payroll program executing on a payroll computing system, the payroll activity data.

12. The system of claim 9, further comprising:
the loan program further performing the operation of:
receiving, by the loan program from a borrower program executing on a borrower computing system, application data for the loan program that is compared against the conditions.

13. The system of claim 9, further comprising:
the originator computing system comprising the originator program, wherein the originator program executes on the originator computing system and performs the operations of: sending, by the originator program to the loan service program, a remote procedure call to initiate the loan service program; and
sending, by the originator program to the loan program, a service identifier identifying the loan service program.

14. The system of claim 9, further comprising:
the buyer computing system comprising the buyer program, wherein the buyer program executes on the buyer computing system and performs the operation of: sending, from the buyer program to a proxy contract program executing on a proxy contract computing system, a profile identifying the loan program from within a pool of loan programs;
the proxy contract computing system comprising the proxy contract program, wherein the proxy contract program executes on the proxy contract computing system and performs the operations of: invoking, by the proxy contract program, a purchase function of the loan program to update the loan program based on the buyer program; sending, from the proxy contract program, a claim to the loan service program; and
the loan service computing system comprising the loan service program, wherein the loan service program executes on the loan service computing system and performs the operation of: updating, by the loan service program, receiver data to the buyer program in response to the claim.

15. The system of claim 9, further comprising:

the loan service computing system comprising the loan service program, wherein the loan service program executes on the loan service computing system and performs the operation of: invoking, by the loan service program, a receive function of a payment channel program executing on a payment channel computing system;

the payment channel computing system comprising the payment channel program, wherein the payment channel program executes on the payment channel computing system and performs the operations of: invoking, by the payment channel program, a collect function of a borrower program executing on a borrower computing system to transfer payment data; and invoking, by the payment channel program, a transfer function of the buyer program to transfer payment data.

16. A non-transitory computer readable medium comprising computer readable program code for:

receiving by a loan program executing on a loan computing system, conditions from an originator program executing on an originator computing system, wherein the conditions are displayed by the loan program on a user interface of the loan computing system;

sending, by the loan program, the conditions to a wallet program executing on a wallet computing system;

receiving, by the loan program, cryptographic proof that the conditions are met from the wallet program, wherein the cryptographic proof is displayed by the loan program on the user interface of the loan computing system, wherein the wallet program retrieved a first proof from the wallet program, received a second proof from a credit reporting service program executing on a credit reporting service computing system, received a third proof from the originator program, and generated the cryptographic proof from the first proof, the second proof, and the third proof;

updating, by the loan program, ownership data of the loan program to identify a buyer program executing on a buyer computing system in response to invocation of a purchase function of the loan program, wherein the ownership data is displayed by the loan program on the user interface of the loan computing system; and appending, by the loan program, payment receipt data to the loan program in response to invocation of a payment append function of the loan program by a loan service program executing on a loan service computing system, wherein the payment receipt data is displayed by the loan program on the user interface of the loan computing system.

17. The non-transitory computer readable medium of claim 16, further comprising computer readable program code for:

receiving preconditions, by the loan program from the originator program, wherein the loan program stores the preconditions within the loan program;

sending a condition, by the originator program to an acceptance program executing on an acceptance computing system, wherein the condition matches one of the preconditions and identifies a threshold value of income data; and receiving, by the acceptance program, a concordance from a payroll program executing on a payroll computing system, wherein the concordance includes a proof of periodic income for comparison to the threshold value.

18. The non-transitory computer readable medium of claim 16, further comprising computer readable program code for:

receiving, by the wallet program from a borrower program executing on a borrower computing system, activity data related to a condition of the conditions;

receiving, by the wallet program from the borrower program, credential data for payroll activity data; and receiving, by the wallet program from a payroll program executing on a payroll computing system, the payroll activity data.

19. The non-transitory computer readable medium of claim 16, further comprising computer readable program code for:

receiving, by the loan program from a borrower program executing on a borrower computing system, application data for the loan program that is compared against the conditions.

20. The non-transitory computer readable medium of claim 16, further comprising computer readable program code for:

sending, by the originator program to the loan service program, a remote procedure call to initiate the loan service program; and sending, by the originator program to the loan program, a service identifier identifying the loan service program.

\* \* \* \* \*